W. H. CALEY.
COFFEE POT.
APPLICATION FILED APR. 13, 1911.
1,010,582.
Patented Dec. 5, 1911.
2 SHEETS—SHEET 1.
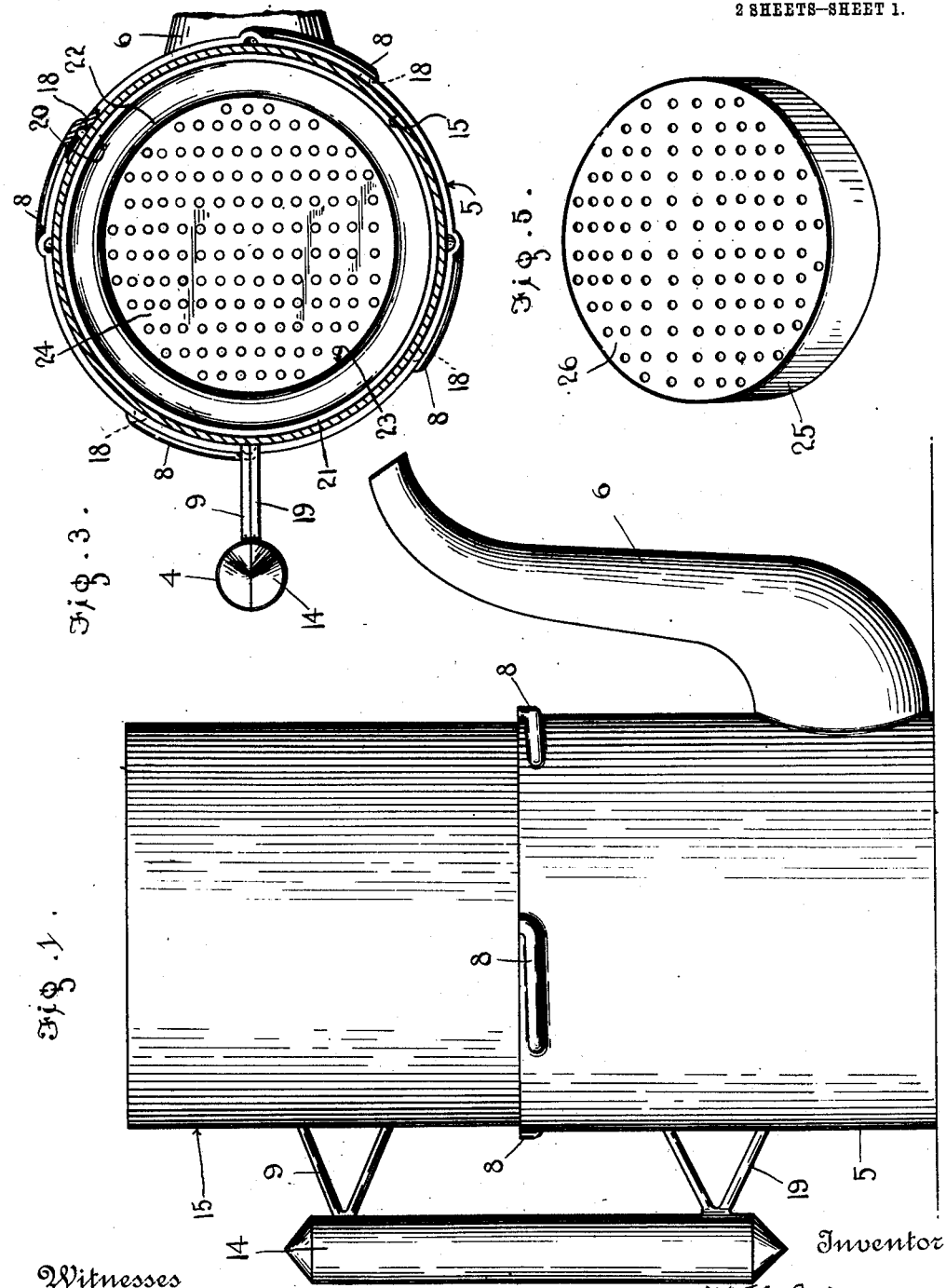
Witnesses
L. B. James
O. B. Hopkins
Inventor
W. H. Caley
by H. B. Willson & Co
Attorneys

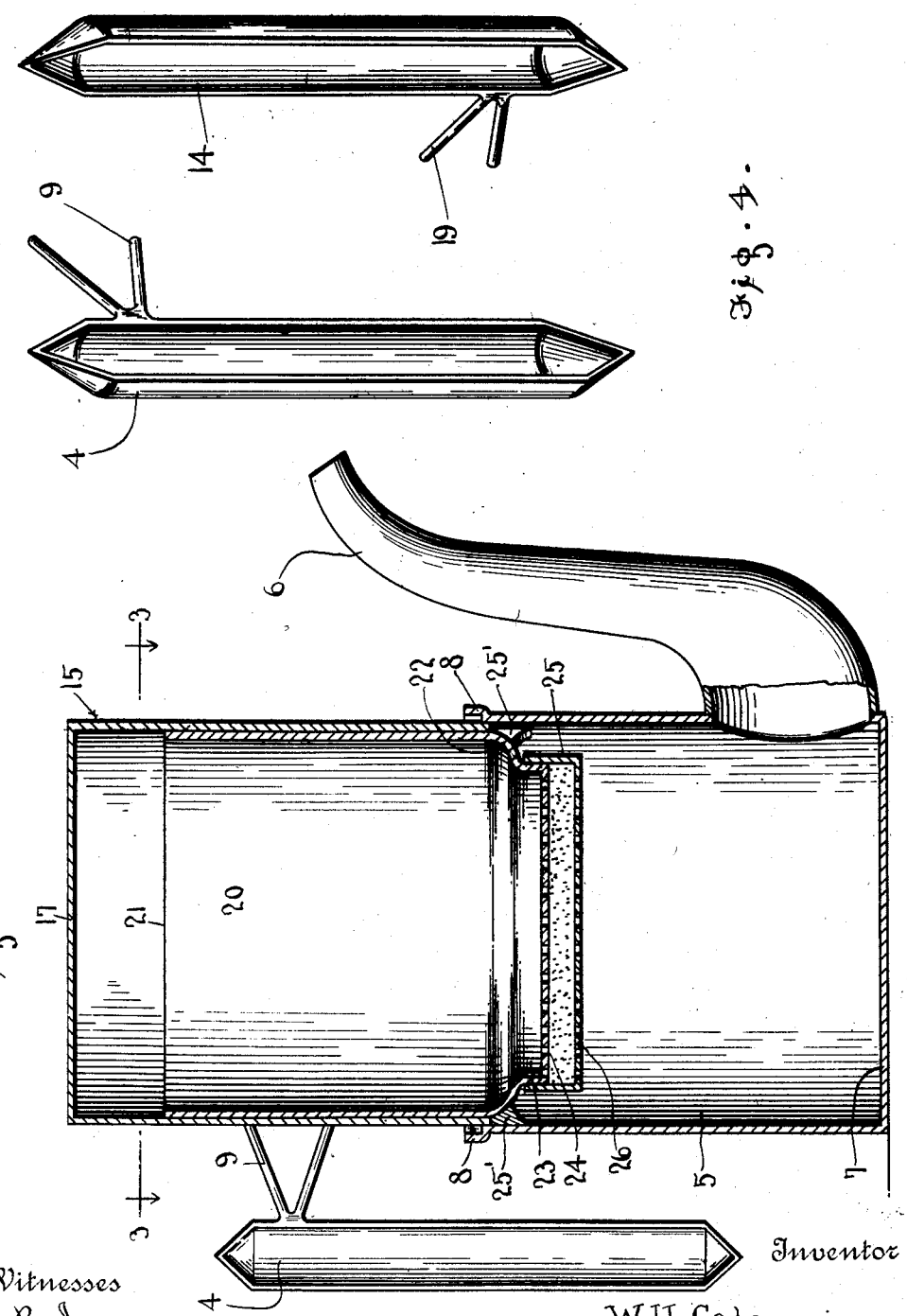

UNITED STATES PATENT OFFICE.

WILLIAM HENRY CALEY, OF LITTLETON, COLORADO.

COFFEE-POT.

1,010,582.

Specification of Letters Patent.

Patented Dec. 5, 1911.

Application filed April 13, 1911. Serial No. 620,814.

*To all whom it may concern:*

Be it known that I, WILLIAM HENRY CALEY, a citizen of the United States, residing at Littleton, in the county of Arapahoe and State of Colorado, have invented certain new and useful Improvements in Coffee-Pots; and I do declare the following to be a full, clear, and exact description of the invention, such as will enable others skilled in the art to which it appertains to make and use the same.

This invention relates to domestic cooking utensils, and more especially to coffee pots; and the object of the same is to produce a two-member invertible body having a sectional handle to hold the members together, and an improved form of container for the water and measuring receptacle for the coffee. This object is accomplished by the detailed construction hereinafter more fully described and claimed, and as shown in the drawings, wherein—

Figure 1 is a side view of the coffee pot; Fig. 2 is a vertical section through the coffee pot; Fig. 3 is a horizontal sectional view on the line 3—3 of Fig. 2; Fig. 4 is a detail perspective view of the handle in a separated position; Fig. 5 is a detail perspective view of the coffee containing cap.

In the drawings the body of this pot is shown as made up of two members, a top and a bottom. The latter numbered 5 is herein shown as cylindrical, although it could be in the shape of a truncated cone, and it has a spout 6, a closed bottom 7, and an open upper end surrounded by any suitable fastening means for connecting it with the top member, herein designated as one section of thread 8, and internally it is provided with lugs 25' just below said threads. The top member should be strictly cylindrical, and herein its body is designated by the numeral 15 and its closed upper end by the numeral 17, while there is formed around its open lower end a companion thread 18 to engage with that numbered 8. It is to be understood, however, that the connection between these two members could be by other means than threads. When so made, these members are by preference practical duplicates of each other and of substantially the same contour so that their threads, or bayonet-joints or other form of connection, may be engaged readily to unite the two members into one body which normally stands upright upon its bottom 7 so that the spout 6 may be used as is customary in coffee pots. The sizes and materials of parts are not essential.

The handle best illustrated in Fig. 4, is made in two sections or halves which are complementary of each other and are herein numbered 4 and 14, being respectively secured by brackets 9 and 19, to the lower member 5 and the upper member 15. When so made, the assembling of said members as by screws or bayonet-joints brings the halves of the handle into contact with each other, and if these halves are semi-circular in contour they make up a substantially round handle when their flat faces stand together. It results that when the coffee pot is lifted by this handle the act of grasping the handle in the hand serves also to hold the members together so that they may not become accidentally disconnected.

Insertible into the cylindrical top member 15 is a cylindrical water container 20 which must be of slightly less circumference than that of the top member 15 so as to fit slidably and telescopically therein, and is by preference slightly less in length as shown in Fig. 2. What might be called its upper end is open as at 21. What might be called its lower end is provided with a reduced shoulder 22, beneath which is a cylindrical neck 23, and the latter is closed by a foraminous sheet 24. The coffee receptacle consists of a band 25 which is of a size to fit closely around the neck 23, and a foraminous sheet 26 which closes what might be called the lower end of this band, thus making of this receptacle a cup which, when the same is in place on the neck 23, is closed by the other foraminous sheet 24 with the coffee between the two sheets. These parts are also by preference entirely of metal, and the size is immaterial.

In the use of this improved coffee pot, the two body members are disconnected, the bottom member 5 permitted to stand alone, and the top member 15 inverted so that its closed bottom 17 rests upon the table and the open top is presented for use. The coffee receptacle is removed from the water container and the latter from the top member. It is my purpose to provide each coffee pot with several receptacles of different sizes by means of different depths, so that the user may regulate the amount of coffee to be placed therein according to the number of cups thereof which it is desired to make. Having selected the proper one, this receptacle is filled with the coffee and its band placed over and around the neck 23. Any suitable form of detachable connection between these parts may be used, if desired, but I have omitted illustration thereof because usually the frictional contact between the band and neck will be sufficient. The coffee is thus confined between the two foraminous sheets whose meshes will have a degree of fineness proportionate to the kind of coffee employed. In fact, the coffee receptacle may be furnished in not only different sizes but also of different meshes of the foraminous sheet for this purpose. The proper amount of cold water necessary to make the desired number of cups of coffee is then put into the top member 15 which at this time is inverted. The connected water container and coffee receptacle are then inserted part way into said top member with the open end of the container toward the closed end 17 of the member so that the coffee is not brought into contact with the water. The next step is to invert this member and connect its open end with the open upper end of the top member 15 by whatever means are employed for this purpose, and in this act the lugs 25' are brought into contact with the shoulder 22 of the receptacle and the latter is pushed telescopically into the top member as far as is necessary to permit the threads or other connections 8 and 18 to engage. The lugs will of course hold the water receptacle in that position whatever the position of the two members at this time or later. The entire device is then up side down so that it stands in a reversed position from that shown in Fig. 2, and it is set upon the stove so that the closed end 17 of the top member 15 forms temporarily the bottom of the coffee pot, and the heat of the stove striking through this end boils the water and the steam thereof rises through the coffee and accumulates within the other body member 5. Thus the coffee whether in the form of a bean or ground is given a preliminary steaming before the water actually comes in contact with it, and I find that this preliminary treatment of the coffee is beneficial in the final results. After permitting the steaming to go on for a proper length of time, the whole device is inverted to the position shown in Fig. 2, and the water then percolates through the foraminous sheet 24, then the coffee, then through the other sheet 26, and finally accumulates within the bottom member 5 in the form of a strong infusion which may be poured out the spout 6 in the usual manner. Throughout all of this time there has been no chance for the aroma to escape, and therefore the coffee is not only impregnated with the aroma that is contained in the steam but it is also to a degree made stronger by the effects that such steam has on the liquid infusion.

It is quite desirable that the screw or bayonet-joint connection between the body members shall not be so tight but that steam may escape from it in limited quantities if the boiling is too vigorous, although some steam may pass out of the spout (if the valve usually employed therein is of a proper character) and hence the bursting of the device is avoided.

I consider it essential that the water container shall have a truly cylindrical body slightly less in circumference than the truly cylindrical body 15 of the top member so that these two will telescope accurately as shown in Fig. 2. The obvious purpose of this construction is to cause the water within the member 15 to pass inside the container when they are inverted, rather than passing outside of it when it would not be caused to flow through the coffee.

I have herein described and claimed this device as a coffee pot, but it will be understood that it may be used in substantially the same manner for making any kind of an infusion, such for instance as chocolate, tea, and other beverages. Especially is it adapted to this use by reason of the fact that the pot is intended to be furnished to the purchaser with several containers of different sizes and having foraminous sheets of different mesh.

What is claimed as new is:

1. A coffee pot comprising upper and lower substantially cylindrical body members having closed outer ends and open inner ends, means for detachably connecting the latter by a partial rotary movement of one member with respect to the other, a handle made in two complementary halves whereof each stands parallel with the axis of one of said members, and connections between the upper end of one half and the upper member and between the lower end of the other half and the lower member, all parts being so disposed that the halves of the handle are brought together when said members are engaged with each other.

2. A coffee pot comprising upper and lower body members having closed outer ends and open inner ends, the latter adapted to pass one inside the other, threads on these ends adapted to engage by a partial relative rotary movement of the members so as to connect the latter, a handle made in two half-round complementary parts, and brackets each connecting one part with one member at such a point that when the members are turned to engage their threads the parts will be brought together.

3. In a coffee pot, the combination with a bottom member having a spout and a closed bottom and open upper end, and lugs contained within the latter; of a top member having a cylindrical body, a closed upper end, and an open lower end, means for detachably connecting the open ends of said members, a water container comprising a cylindrical body of a circumference to fit slidably and telescopically within said top member than which it is shorter in length, its upper end being open and its lower end having a reduced shoulder adapted to contact with said lugs when the two members are pushed together and a neck beyond said shoulder, and a coffee receptacle detachably connected with said neck.

In testimony whereof I have hereunto set my hand in presence of two subscribing witnesses.

WILLIAM HENRY CALEY.

Witnesses:
 GEO. E. BEACH,
 F. P. MASSEY.